Oct. 28, 1969 J. L. COX ET AL 3,475,582
WELDER ALIGNMENT AND POSITIONING FIXTURE
Filed Dec. 12, 1966 3 Sheets-Sheet 3

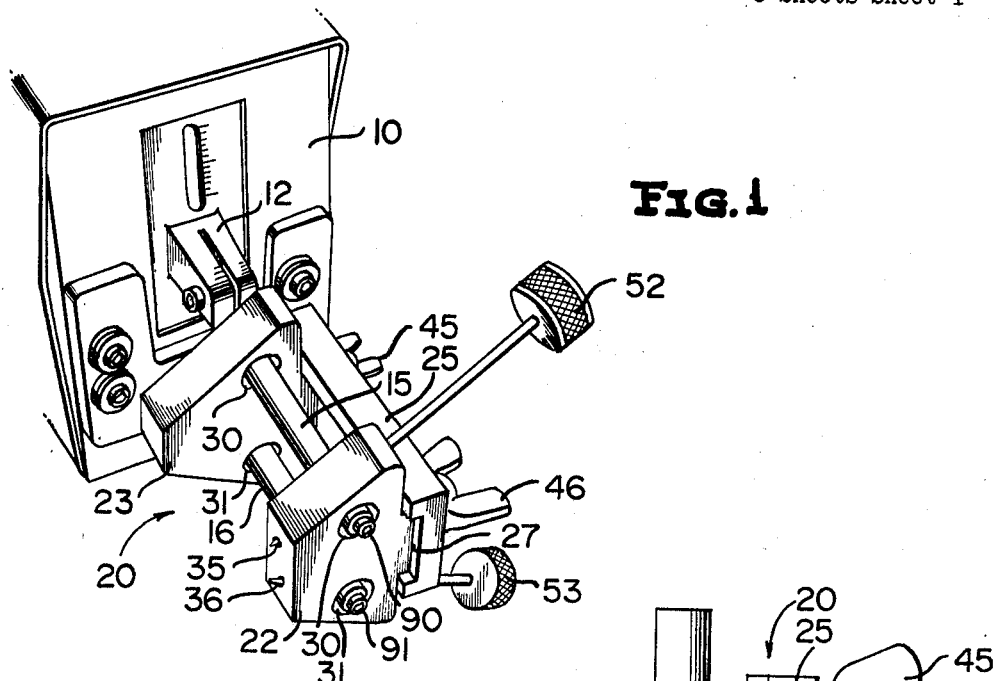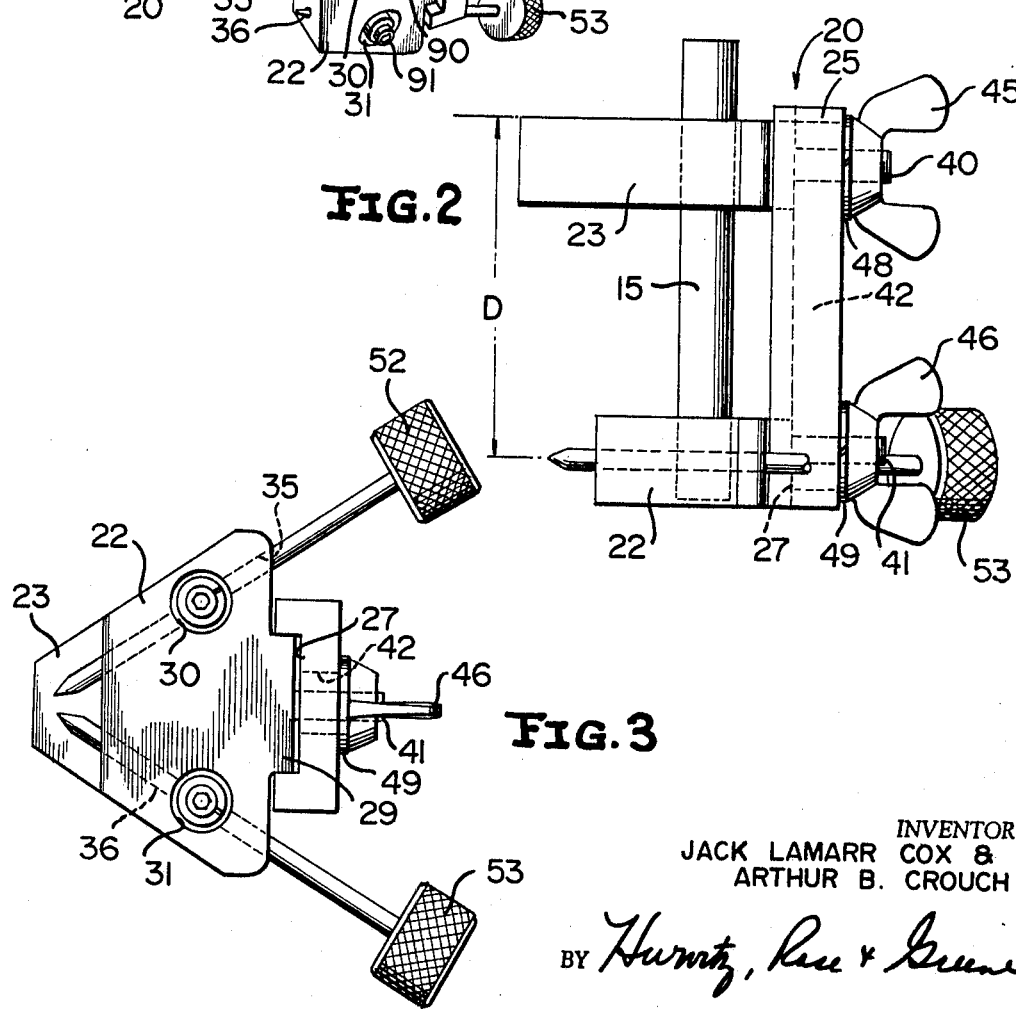

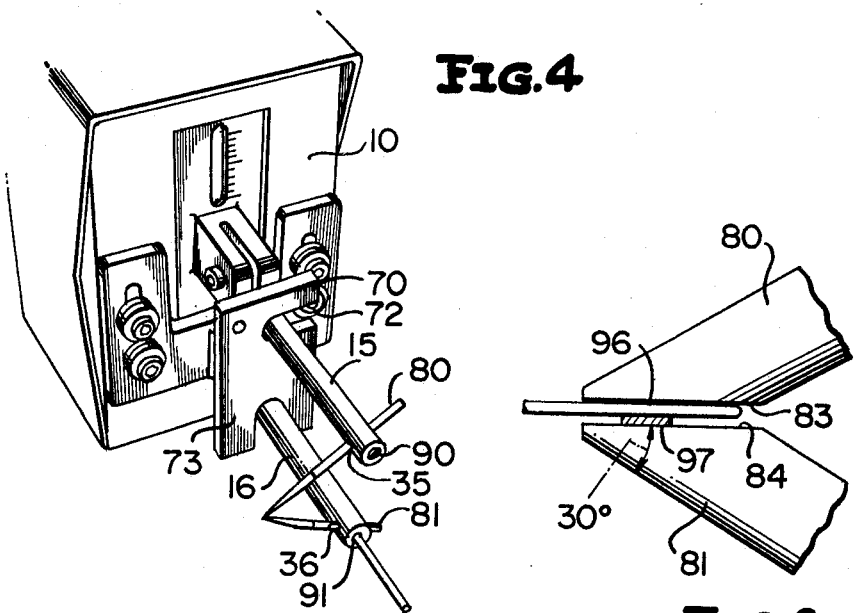
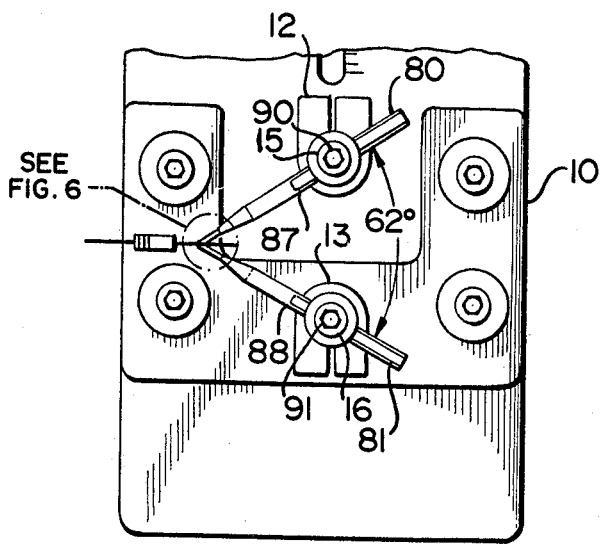

INVENTORS
JACK LAMARR COX &
ARTHUR B. CROUCH

BY Hurvitz, Rau & Greene

ATTORNEYS

United States Patent Office 3,475,582
Patented Oct. 28, 1969

3,475,582
WELDER ALIGNMENT AND POSITIONING FIXTURE
Jack Lamarr Cox and Arthur B. Crouch, Eau Gallie, Fla., assignors to Radiation Incorporated, Melbourne, Fla., a corporation of Florida
Filed Dec. 12, 1966, Ser. No. 600,903
Int. Cl. B23k 9/28
U.S. Cl. 219—119
8 Claims

ABSTRACT OF THE DISCLOSURE

A fixture associated with a resistance welder includes a block for slidably receiving electrode holders of the welder and movable along a guide bar in a direction parallel to the axis of each holder to assume a position separated from the welder by a distance depending on the items to be welded and the length of the holders. The block is secured at a point along the guide bar where electrode receiving holes in each holder may be aligned with holes in the block defining a desired angular orientation for the electrodes when a welding operation is to be performed. The electrode holders are relatively movable in a direction perpendicular to their axes, and a slotted plate for use in producing parallelism between the welding tips of the electrodes is placed over the electrode holders to confine them to a predetermined spacing relative to one another, to permit bringing the welding tips of the electrodes into contact when in the desired angular orientation.

---

The present invention relates generally to resistance welders and more particularly to methods and apparatus for facilitating the alignment and positioning of the electrodes and electrode horns on a resistance welder head.

In resistance welding heads of the type in which a pair of electrodes are mounted on horns, one fixed to the head and one supported on a movable carriage such that the electrodes may be separated in accordance with the thickness of the items to be welded, a major problem exists in the proper positioning and alignment of the electrodes prior to proceeding with the welding operation. In general, the electrode tips are positioned in contact with the work to be welded by appropriate adjustment of the movable carriage. As pressure on the work between the electrodes increases by further adjustment of the movable electrode in contact with the work pieces the welder is automatically energized and current flows through a circuit including the electrodes and the metal work pieces such that a weld is formed at the point or points of high resistance between the pieces to be welded. Resistance welders of this type are disclosed, for example, in U.S. Patents 2,872,564 and 3,036,199, and are used quite often in the welding of miniature electronic components and leads.

Typically the electrodes are provided with extremely small conical tips or faces formed at an angle of 30° to the electrode shank. Proper operation of the resistance welding head and the provision of suitable welds requires that these tips or faces be perfectly aligned with one another and perfectly parallel at the specified welding pressure on the work pieces. From an economic standpoint, it is also important that the tips be readily and rapidly inserted in the area where the weld is to be made, with this proper alignment and parallelism. It is quite apparent that replacement of the electrodes is necessary on a rather frequent basis, because of pitting and general deterioration as a result of the high current therethrough and the resistance present at the contact between the work to be welded and the tips. Consequently it is essential that once proper alignment and positioning of electrodes and tips thereof are accomplished for a particular resistance welding head, it will not be necessary to embark upon an elaborate and extensive procedure to reproduce the desired alignment and positioning each time an electrode or electrodes are to be changed. Since normal electrode replacement may be required as often as several times per week for a typically active facility, it will be observed that production time and expense are severely increased if substantial periods of machine stoppage are necessary for prearrangement of the electrodes as a condition to the obtaining of high quality welds.

Accordingly, it is a principal object of the present invention to provide devices for facilitating the initial alignment and positioning of welding electrodes on the electrode horns of a resistance welding head.

It is a further object of the invention to provide such facilitating devices by which subsequent elaborate positioning and alignment of electrode tips, upon replacement of the electrodes, is obviated.

In resistance welding heads of the aforementioned type, the electrodes are inserted and locked within apertures in the electrode horns. The horns are mounted in brackets fastened to the front of the welding head, and after proper alignment and positioning of the electrode tips or faces, the horns are securely locked in the brackets. The items to be welded may then be interposed between confronting faces of the electrodes upon appropriate separation of the electrode tips by adjustment of the movable bracket. Each time the electrode tips show signs of wear, or the electrodes require replacement, the same tedious positioning and alignment procedure must be repeated, the machine operator required to gauge by eye.

According to one aspect of the present invention a welder horn alignment fixture is provided, the fixture comprising a bar along which a pair of positioning blocks are releasably retained in sliding relationship so that they may be separated by a desired distance depending upon the distance to be maintained between the most forward points of the mounting brackets and the electrodes. The latter distance in turn depends upon the size of the pieces to be spot welded by the welding device. Each of the movable blocks is provided with a pair of spaced through holes suitable for accepting the electrode horns in relatively close fitting relationship. The through-hole pattern is identical for each block so that corresponding ones of the holes are aligned along a common axis. One of the blocks also has a pair of apertures extending through its body to exterior surfaces thereof. The latter apertures are so aligned that their axes intersect at a point remote from an exterior surface of the block, the angle between the apertures being dependent upon the angle of the tips of each electrode relative to its shank, these apertures being suitable for accepting the electrodes. Normally, the angle between apertures will vary from approximately thirty degrees to one hundred eighty degrees, a typical example being 60 degrees for edectrode tip angles of 30°. After the blocks are separated along the bar by the desired distance and securely tightened to the bar, the horns are inserted into the mating through-holes of the blocks. A pair of precision-machined aligning pins are then inserted into the respective angularly separated apertures in the block most remote from the welding head, and the horns rotated about their axes in the respective through-holes until each pin extends also through the electrode-positioning hole in the respective horn. The ends of the horn remote from the ends at which the electrodes are to be fastened are inserted into the mounting brackets of the welding head and the bracket bolts tightened to secure the horns in position. The alignment pins are then removed from the fixture and the fixture removed from the horns. This procedure results in accurate alignment of the electrode-positioning holes at the desired angle, relative to one another, and eliminates need for any further adjustment of the horns when electrodes are replaced or cleaned and reinstalled.

In accordance with another aspect of the invention, an electrode positioning fixture is utilized to assure that the proper length of electrode extends from each horn and that the electrode faces are in perfect parallelism. To this end, the electrode positioning fixture permits final adjustment of the distance between electrode horns such that when the electrodes are inserted into the appropriate apertures in the electrode horns and extended until their respective faces are in contact, the faces are completely parallel and occupy the same region of space, i.e., are not displaced relative to one another.

The above-mentioned aspects, features and methods of the present invention provide distinct advantages over prior art arrangements and methods of welder horn and electrode positioning and alignment. There remains, however, the possibility that the electrode faces, while perfectly parallel with respect to one another, are skewed relative to the plane containing the line bisecting the angle between the electrodes, said plane being normal to the plane containing the axes of both electrodes. For the sake of convenience and simplicity, this type of electrode face alignment or nonalignment will be referred to as "side-to-side" parallelism (relative to the aforementioned plane containing the bisector), or alignment, while the electrode face alignment accomplished by use of the horn alignment and electrode positioning fixtures, in which the faces are assured parallelism to one another and to the line bisecting the angle between electrodes (as opposed to said plane containing that line), will be referred to as "front-to-back" parallelism or alignment. It is not intended that the quoted terminology have any meaning beyond that discussed immediately above.

Lack of side-to-side parallelism of the electrode faces results in undesired welding resistance, imperfect welds, and imperfect alignment of work pieces (items to be welded), i.e., displacement of the work pieces such that the weld points are translated relative to the point or points at which a weld is desired. According to further aspects of the present invention, side-to-side parallelism of the electrode faces is assured by provision on each electrode of a perfectly flat "aligning surface" displaced 90 degrees from the location of the electrode face, about the periphery of the electrode; and by provision in each electrode horn of a tapped hole extending from an end thereof into perpendicular intersection with the aperture accommodating the electrode, the tapped hole receiving a set screw having a perfectly flat end face adapted to "bottom" against the flat surface (or simply "flat") on the electrode. Accordingly, when the set screw is tightened against the electrode flat, the associated electrode assumes a predetermined precise orientation within its respective aperture, and more specifically an orientation which in conjunction with that of the other electrode of the pair results unalterably in side-to-side parallelism, in addition to the front-to-back parallelism assured by the aforementioned fixtures.

It is therefore another object of the present invention to provide electrode horn and cooperation electrode structure which facilitiates the alignment of the electrode faces.

Still another object is to provide a welder electrode horn having an aperture for receiving an electrode and a set screw-accepting hole intersecting that aperture such that the set screw, when threaded therein, contacts a cooperating surface on the electrode to precisely orient the electrode face in predetermined alignment with the face of an electrode in a corresponding horn-electrode arrangement, to assure side-to-side parallelism therebetween.

The fact that a set screw arrangement is used, rather than the customary arrangement in which the electrode is placed in a hole aligned with a slot, the width of the slot being variable to permit locking and unlocking the electrode, insures that the electrode will not undergo turning or twisting within its electrode horn while in use.

It is another object of the present invention to provide methods and apparatus for installation of electrode horns and electrodes in a resistance welder, such that the electrodes are rapidly and accurately positioned for precision welding without subsequent adjustment of the horns.

The above and still further objects, features and attendant advantages of the present invention will become apparent from a consideration of the following detailed description of a preferred embodiment thereof, especially when taken in conjunction with the accompanying drawings, in which:

FIGURE 1 is a fragmentary perspective view of a resistance welding head with a welder horn aligning fixture of the present invention fastened thereto;

FIGURE 2 is a plan view of the welder horn alignment fixture of FIGURE 1;

FIGURE 3 is an end view of the alignment fixture of FIGURE 2;

FIGURE 4 is a fragmentary perspective view of the welder head with electrode positioning fixture located on electrode horns;

FIGURE 5 is an end view of the electrode horns in the welder head, with electrodes fastened in position;

FIGURE 6 is a detail view of the electrode tips with items to be welded disposed therebetween;

Figure 7:
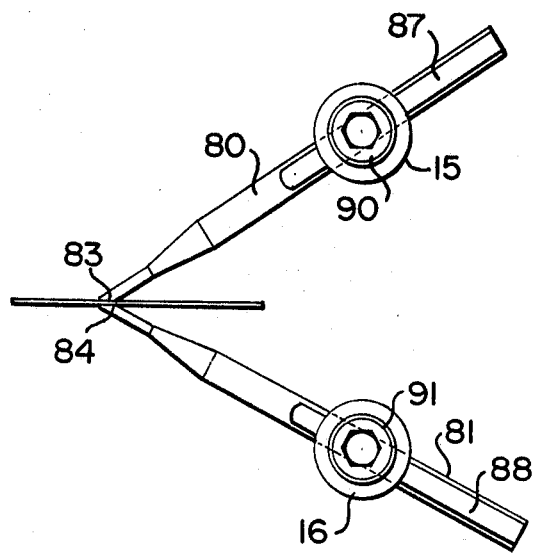
FIGURES 7 and 8 are views of the electrode horns and electrodes during the alignment procedure.

Referring now to the drawings, the conventional resistance welding head 10 (FIGURES 1, 4 and 5) includes a pair of brackets 12 and 13 (FIGURE 5) adapted to fasten electrode horns 15 and 16, respectively, to the head. Bracket 12 is movable vertically to permit vertical positioning of the horns and thus of the electrodes to be attached thereto.

The electrode horn alignment fixture 20 (FIGURES 1-3) according to the present invention includes a pair of horn positioning blocks 22 and 23, which are adapted to slide along a guide bar or guide rail 25. To this end, the guide rail is provided with a groove or channel 27 into which stems 29 of the positioning blocks fit in slidable relation. Each positioning block 22 and 23 is provided with a pair of spaced holes 30 and 31, corresponding holes on each block being placed in registered alignment when the stems of the positioning blocks are located within the channel 27 of the guide rail. The holes 30, 31 are of sufficient diameter to receive the electrode horns 15 and 16 in relatively close fitting relationship therewith.

While block 23 is illustrated as having a generally arrowhead-like shape and block 22 a shape which may be generally likened to a blunt arrowhead, these particular shapes are not critical, the important features being that the blocks have members which permit their slidable movement along the guide bar and that the blocks have aligned holes for accepting the electrode horns. Positioning block 22 is provided with a further pair of holes 35, 36 extending transversely therethrough at an angular relationship which depends upon the angle at which the electrodes are to be maintained when in use on the resistance welding head. In this particular example the angle at which the axes of apertures 35 and 36 intersect is fixed at approximately 62°.

A threaded extension 40 and 41 for each of the positioning blocks 23 and 22 respectively, projects from the end of stem member 29 through a longitudinal slot 42 in the guide rail so that the positioning blocks may be secured at desired separated points on the guide rail by respective wing nuts 45 and 46 and lock washers 48 and 49, which mate with the threaded extensions.

A pair of precision machined locating or positioning pins 52 and 53 are adapted to be accepted by the angularly positioned apertures 35 and 36, respectively, to permit alignment of the electrode holes 38 and 39 (FIGURES 4 and 8) in horns 15 and 16 with apertures 35 and 36 when the alignment fixture is mounted to the horns.

In use of the alignment fixture, the two movable positioning blocks 22 and 23 are separated by loosening wing nuts 45 and 46 and sliding the bars within the guide rail. The spacing between the movable blocks will depend upon the desired distance from the front brackets 12 and 13 on the welding head to the electrodes themselves, as shown in FIGURE 2. If, for example, it is desired that the distance D from the welding head to the center of each electrode 2½", the blocks are so adjusted as shown in FIGURE 2. The electrode horns 15 and 16 are then inserted into the aligned holes 30 and 31 in the two positioning blocks, and the locating pins 52 and 53, preferably steel, are inserted through apertures 35 and 36 in positioning block 22. In the process, the electrode horns are rotated within the positioning block holes to permit each of the steel pins to pass through a respective hole 38, 39 in the horn and thence through the remaining portion of the apertures in positioning block 22. This operation assures that the electrode-accepting holes or apertures in the horns are positioned in angular relationship to each other such that subsequently installed electrodes will be properly aligned. The end of each horn remote from the electrode-accepting hole is inserted into a respective bracket 12, 13 on the welding machine head, the movable bracket 12 being adjusted relative to fixed bracket 13 to permit acceptance of the horns by the brackets. Tightening of the bracket bolts then secures the electrode horns in position on the head.

Once the steps which have thus far been described have been completed for a particular welding machine or resistance welding head, there is no further need for the electrode head alignment fixture 20 and it may be then removed from the horns.

An electrode positioning fixture 70 (FIGURE 4) comprising a flat metal plate, generally rectangular in shape, and having a pair of perpendicularly aligned slots 72 and 73, is employed in the final adjustment of the electrodes in the electrode horns. Each of slots 72 and 73 extends partially through plate 70 and is of sufficient width to receive the respective electrode horn therein. The electrode positioning plate is slid over the horns, each horn passing through a rspective slot therein until the plate abuts against the frontal portion of the horn mounting brackets 12 and 13. Thereafter, the horns are moved as close together as the positioning plate 70 will permit.

Electrodes 80 and 81 are then inserted into respective electrode-accepting holes 35 and 36 in the electrode horns. Typically, the tips of the electrodes are provided with machined faces 83 and 84 (FIGURE 6), respectively, at an angle of 30 degrees with the respective electrode shank. The specific face angle is unimportant, however, so long as the angle of intersection of the axes of the holes in positioning block 22 is preselected in accordance with the face angles in a manner to be described. The electrodes are rotated within the apertures in the horns until the tip faces 83 and 84 are perfectly parallel in confronting relationship (FIGURES 7 and 8), at which point flat surfaces (or simply flats) 87 and 88 on the respective electrode shanks are perpendicular to the set screws 90 and 91 in the end of each horn, and therefore parallel to the flat ends of the set screws. The tip faces 83 and 84 are then set in continuously contacting relationship by appropriate adjustment of extent of insertion of electrodes through the horns, and the respective set screws tightened. Electrode positioning plate 70 is then removed from the horns by rotating the plate until horn 15 is free of slot 72 and then sliding slot 73 from horn 16.

Figure 8:
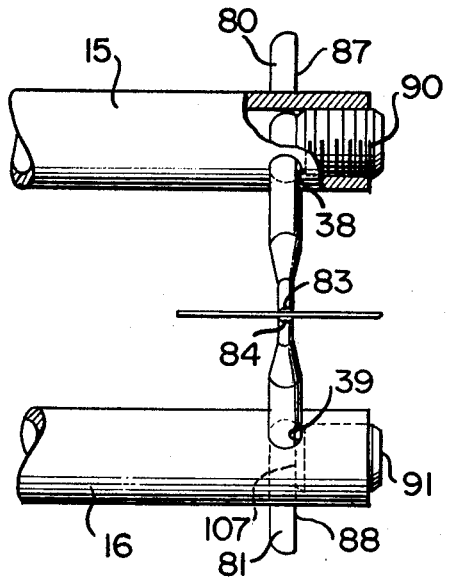
Figure 9:
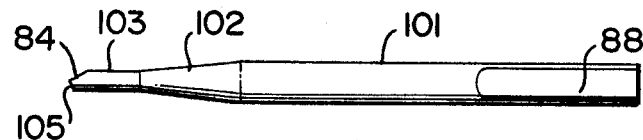
FIGURES 9 and 10 are side views of the electrodes, showing exemplary structural details.
Figure 10:
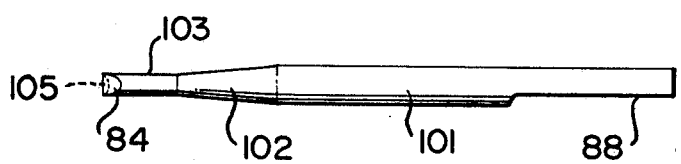

The manner is which this final alignment of the electrodes is accomplished will be more clearly understood by reference to the end and side views of the electrode horns with electrodes mounted therein, as shown in FIGURES 7 and 8; and by reference to the exemplary electrode structure shown in FIGURES 9 and 10.

Referring first to FIGURES 9 and 10, which constitute side views of a single electrode taken 90 degrees apart the periphery of the electrode, corresponding to electrode 81 in the remaining figures, the electrode may comprise a cylindrical shank portion 101, a conical section 102, and a tip portion 103. The tip 103 is provided with a perfectly flat face 84 at a specified angle to the axis of the electrode, say 30 degrees, and with a smaller flat region 105 at an angle to the face 84, say 90°. Flat region 105 is provided to prevent the existence of any thin delicate sections along electrode face 84, as would occur otherwise at the very point of the tip.

A flat surface 88 is provided along shank 101, displaced 90 degrees about the axis of the electrode relative to face 84, and conveniently extends to the end of the shank. It will be clear, of course, that the electrodes of a particular pair are mirror images of one another, i.e., one "right-hand" and one "left-hand."

The electrode horns 15 and 16 are each provided with a set screw 90, 91, respectively (FIGURES 7 and 8), which may be slotted for use with a screwdriver or socketed, as shown, for use with an Allen wrench, for example. The bottom end 107 (or end to be bottomed against the electrode) of the set screw is machined perfectly flat and perpendicular to the axis of the screw. The hole in each horn to receive the respective set screw intersects tthe electrode-accepting hole at an angle of 90 degrees. Hence, after the electrodes are inserted into their respective holes and pushed together so that their faces are in contact throughout, the set screws may be tightened against the flats 87, 88 of the electrodes; thereby assuring a plane of contact ebtween the faces coincident with the plane containing the bisector of the angle between the electrodes and perpendicular to the plane containing the axes of both electrodes. In other words, the electrode faces are provided with front-to-back and side-to-side parallelism and alignment, except for any intentional lack of parallelism to be corrected by pressure against the electrodes.

Positioning of the electrodes in the aforementioned manner may be repeated as frequently as required by wear of the electrode faces, typically several times per week when the welding machine is in operation in a normally active facility.

At this point the electrode faces are perfectly aligned, as will be appreciated by noting that the electrodes have been installed at a 62 degree angle (i.e., the angle of intersection of the axes of apertures 35 and 36, FIGURE 5) and the electrode faces are machined at a 30 degree angle to the respective shanks. Hence, the electrode faces are out of parallel by about 2 degrees until pressure is applied to the tips. When the electrode faces are separated and work pieces or items 96, 97 (FIGURES 5 and 6) to be welded inserted therebetween, however, application of pressure to the electrodes, typically ten pounds, causes flexing of the electrodes to precisely compensate for the previous lack of parallelism. Thus, the electrode tip faces are accurately aligned in perfect parallel relationship, both front-to-back and side-to-side, against the items to be welded when the machine is in use.

While we have disclosed a preferred embodiment of our invention, it will be apparent to those skilled in the art to which the invention pertains that variations in the specific details of construction which have been illustrated and described may be resorted to without departing from the spirit and scope of the invention.

We claim:

1. In an assembly for facilitating the alignment and positioning of welding electrodes on the electrode horns of a resistance welding head, said electrode horns comprising a pair of shafts adapted to be secured in parallel axial alignment in bracket attached to said head, each horn having an aperture extending transversely therethrough, adjacent the end remote from the point of attachment to a respective one of said brackets, at the same angle to its respective axis as that of the aperture extending transversely through the other horn, and having a set screw for securely fastening a respective welding electrode within the respective aperture, in electrical contact with the horn; the combination comprising an electrode horn alignment fixture including a guide bar, a pair of blocks extending transversely from said guide bar and releasably secured thereto for movement along said bar to a desired separation distance, each of said blocks having a pair of through-holes for accommodating said electrode horns when attached to said brackets, one of said blocks having a further pair of through-holes each arranged for registered alignment with an aperture in a respective horn when the horns are inserted into respective ones of the first-named through-holes, and a pair of locating pins for insertion through respective ones of said further through-holes in said one block and respective ones of said apertures in said horns, so that said blocks may be secured to said guide bar after separation by a distance in accordance with the desired positioning of the electrodes relative to said welding lead, and said further through-holes may be set at a desired angle to one another for appropriate positioning of said electrode horn apertures and subsequent attachment of electrodes following removal of said alignment fixture from said horns.

2. The combination according to claim 1 further including an electrode positioning fixture comprising a plate having a pair of apertures therein for receiving said electrode horns and maintaining same at a fixed distance from one another, so that said electrodes may be fastened within said electrode horn apertures when the tips of said electrodes are maintained in contacting relationship with said electrode horns at said fixed distance.

3. The combination according to claim 1 wherein said guide bar includes a channel extending longitudinally therethrough, each of said blocks having a stem portion of shape and dimensions for slidable engagement with said channel, and means for fastening said blocks to said bar in accordance with said desired positioning of said electrodes relative to said welding head.

4. The combination according to claim 1 wherein each of said electrodes is provided with a flat surface, and each said set screw is provided with a flat end, the flat surface being so located relative to the tip face of the respective electrode that when the set screws are tightened such that each said flat end abuts against the respective electrode flat surface, said faces are in alignment.

5. The combination according to claim 4 wherein said flat surface is located 90 degrees about the axis of the electrode relative to the tip face.

6. A method for aligning and positioning of electrodes and electrode horns in variable spaced horn brackets of a resistance welding head, comprising maintaining said electrode horns in fixed parallel relationship, rotating each of said horns about its longitudinal axis until the electrode receiving aperture in each horn is at a desired angle relative to the electrode receiving aperture in the other horn, fastening said electrode horns in said brackets while maintaining said fixed relationship therebetween and said relative angle between electrode receiving apertures, adjusting the spacing of said variably spaced brackets to decrease the distance between said horns to a predetermined amount, inserting said electrodes into the respective ones of said apertures until the tips thereof are in substantially full contact, and securely fastening said electrodes within the respective horn apertures with said tips in said substantially full contact.

7. A fixture for orienting the welding electrodes of a resistance welder to a desired welding position, said resistance welder having a pair of relatively movable mounting brackets each adapted to receive and to secure a respective one of a pair of electrode holders therein, to retain the holders in spaced generally parallel relationship, each holder having the form of a rigid rod with a transverse hole extending therethrough at a common angle to the longitudinal axis of the rod at an end opposite the end at which the respective holder is to be mounted in one of said brackets, the transverse hole in each holder adapted to receive a respective welding electrode, and each holder including means to engage the electrode in the hole in electrical contact with the holder; said fixture comprising means for orienting the holes in said holders according to the desired positional relationship of the electrode during a welding operation, said orienting means including a block having a pair of apertures for slidably receiving said holders in spaced generally parallel relationship, and means slidably retaining said block for movement along a path in which the apertures in said block are aligned with the axes along which the holders are to be mounted in said brackets, said block further including a pair of transverse through-holes respectively intersecting said apertures at said common angle and defining a relative angular orientation corresponding to the desired relative angular orientation of said electrodes when engaged in siad holders in said welding positional relationship, whereby securing of said block at a position along said path relative to said welder and aligning said holes in said holders with respective ones of said holes in said block while said holders are received in the respective apertures in said block, followed by securing said holders in said mounting brackets while maintaining said alignment, is effective to place said electrodes in said desired angular orientation when respectively engaged in said holes in said holders.

8. The fixture according to claim 7 wherein said means to engage the electrode in each holder includes means cooperating with the respective electrode to maintain the welding tip of the respective electrode substantially parallel to the welding tip of the other electrode.

References Cited

UNITED STATES PATENTS

| 3,036,199 | 5/1962 | Page | 219—86 |
| 3,100,832 | 8/1963 | Socoka et al. | 219—86 |
| 3,148,264 | 9/1964 | Clark et al. | 219—86 |

JOSEPH V. TRUHE, Primary Examiner

L. A. SCHUTZMAN, Assistant Examiner